United States Patent [19]

Casazza

[11] Patent Number: 4,824,279
[45] Date of Patent: Apr. 25, 1989

[54] DEVICE AND METHOD FOR METAL STITCHING

[75] Inventor: Mark L. Casazza, Kearns, Utah

[73] Assignee: Morton Machine Company, Inc., Salt Lake City, Utah

[21] Appl. No.: 7,984

[22] Filed: Jan. 28, 1987

[51] Int. Cl.[4] .............................................. F16B 7/00
[52] U.S. Cl. .................................... 403/294; 403/11; 29/402.12
[58] Field of Search ........................ 29/402.12, 402.17; 403/294, 11

[56] References Cited

U.S. PATENT DOCUMENTS 2,506,233  5/1950  Murphy ..................... 29/402.17 X
4,662,806  5/1987  Reed ........................... 29/402.17

Primary Examiner—Andrew V. Kundrat
Attorney, Agent, or Firm—Thorpe, North & Western

[57] ABSTRACT

A device and method for metal stitching of castings and similar structures utilizing a lock insert for strengthening and stabilizing the repaired location and sealing pins for completing the sealing repair of the casting. The lock insert comprises at least one center lobe which is coupled to a plurality of radially smaller locking lobes and a plurality of connecting lobes which are radially smaller than the locking lobes. Each lobe has a cylindrical body and is connected to adjacent lobes to form a locking groove, the composite structure being adapted for insertion into a slot within the repair site which conforms in cross section to the cross section of the insert lock. Insert lock geometry provides full sealing contact around the total body of the lock insert. A sealing pin is provided which includes a head and a threaded shank. The shank is comprised of sectional components including a program shear plane, an upper wedge member and a threaded shank section extending downward therefrom. Also provided is a lower wedge member which operates to develop a crushing effect at the upper and lower threads of the pin to develop an improved seal with respect to the repaired crack in the casting. Methods for use of the lock insert and sealing pin are also disclosed.

8 Claims, 2 Drawing Sheets

DEVICE AND METHOD FOR METAL STITCHING

BACKGROUND OF THE INVENTION:

1. Field of the Invention:

The present invention relates to a method and associated components and devices useful in metal stitching repair of cracked or broken castings and similar metal structures. More specifically, the present invention pertains to an improved lock insert and sealing pin which are the principal devices used in the metal stitching process.

2. Prior Art:

Metal stitching is a cold repair process for sealing a cracked or broken casting. It may be used with many types of metals including aluminum, steel, cast iron, etc. Because it is a cold repair process, it minimizes down time, discontinuities which result from heating and cooling of the casting, Martin site crystallization, poor bonding and other aspects which often arise when the casting is welded or heat treated. It also reduces labor time because there is less need for disassembly of components and less concern regarding possible damage to gaskets, rings or other heat sensitive surfaces and components. It is an ideal type of repair method for field work because it involves little more than a drill and ball peen hammer.

FIG. 1 illustrates prior art components utilized in a conventional metal stitching process. This process is applied, for example, to a crank casing 10 wherein the metal surface 11 is precision ground to a flat surface capable of being mounted to another flat, machine surface with a gasket in between. A break or crack 12 extends from a ring opening 13 across the face of the machine casting surface 11 to a terminal end 14.

The metal stitching process involves preparing a slot 15 which is configured to tightly receive a lock insert 16 which is driven into the slot 15 by means of a ball peen hammer or the like. A typical lock configuration comprises a linear array of cylinders of two different sizes integrally attached in side-by-side relationship. For example, in FIG. 1 cylinder 17 is a cylindrical core of brass, steel, tin or other sturdy metal configured with a common diameter of a given size corresponding to the larger openings of the slot identified as item 18. These larger cylindrical columns are referred to hereafter as locking lobes because they function to lock the respective sides 19 and 20 of the casting opposite the crack or break 13. Each pair of locking lobes 17 are integrally coupled by an intermediate connector lobe 21. This connector lobe 21 has a smaller diameter than the attached locking lobes 17 to provide side wall surface area 23 which resists sliding movement within the slot 15. Similarly, slot 15 includes smaller slot openings 24 which receive the connector lobes 21 in a tight fit. Accordingly, the inserted lock 16 grips both sides 19 and 20 of the casting 10 and restrains against lateral movement which would otherwise permit the crack to widen.

Once the lock 16 is fixed within the casting, repair of the crack 13 is accomplished by the use of sealing pins 25 and 26. This part of the process involves drilling a sequence of holes 27 and inserting into each hole a sealing pin 26. A sample of the sealing pin is shown in FIG. 2, also a prior art representation. The difference between sealing pin 26 and sealing pin 25 is the presence of a break off head 28. As pin 25 is inserted in hole 27, it is rotated by threads 29 until the shank of the bolt 30 shears at a pre-programmed shear plain 31. Illustrated pins 26 of FIG. 1 have sheared and show the exposed top of the broken shank 30. Pin 25 has not yet been fully inserted and retains its upper bolt portion 28. The crack is sealed by inserting additional bolt pins in drilled holes having overlapping or intercepting relationship with each additional lateral pin. In other words, pins 26 were inserted until the bolt portion 28 sheared off. Then a hole was drilled between pins 26 (cutting partially into each pin along the direction of the crack). Pin 25 was then inserted into this intermediate hole and will be rotated into place to seat against both lateral pins 26 and the surrounding casing 19 and 20. Typically, sealing pins 25 have a tapering shank 30 to facilitate easy insertion into the drilled hole. Such drilled holes 27 are sized such that the shank breaks at the shear plain 31 just as the upper end of threads 29 enter the hole 27.

After crack 13 is filled with sealing pins in overlapping relationship over its full length, with the lock 16 inserted, the exposed heads of the sheared pins 26 are hammered and flattened, along with the lock 16. This new inserted or stitched metal structure is then machined to conform to the metal finish 11 of the casting. In this configuration, the lock insert 16 operates to hold the casting pieces 19 and 20 together, while the sealing pins 25 and 26 form a tapered wedge which attempts to develop a strong seal at each side of the crack.

A common problem in the metal stitching process is a break or shear in the central locking lobe 17 which intercepts the crack 13. This is illustrated in prior art FIG. 3 which shows crack 13 concealed under sealing pins 32. It will be noted that the lock 33 has its central locking lobe 34 partially cut away at each edge 35. This is necessary because the sealing pins 36 and 37 are inserted into holes drilled into the body of the locking lobe 34 to ensure a complete seal along the crack line 13. This results in a weak link within the lock insert between the dashed lines 38 and 39. A common problem with current metal stitching procedures, therefore, is a break which occurs within this weakened area. If the lock 33 breaks, the wedging affect of the sealing pins 32 further separates crack 13 and results in leaking oil or other liquids around the repair site.

An additional problem with current methods of metal stitching discovered by the present inventor is liquid flow underneath the lock insert 16 and within the slot 15. As the slot is formed, holes are drilled, creating a base of the slot with pointed cones formed by the pointed ends of the drills used. The present inventor has observed that this open conduit underneath the lock permits flow of oil or other fluids under heavy pressure outward along arrows 40 and 41 underneath the lock structure and opens potential new leak sites around the total periphery of the lock 33. Because of the difficulty of securing a strong seal at the terminal ends 42 of the lock, such oil pressure coming along lines 40 and 41 can often seep through the repair site and leak around the lock insert at points 42. In addition, as the lock is peened, it may rotate slightly and develop small openings at other areas along the periphery of the seal. Loctite (trademark) and other forms of epoxy sealers have been used to fill the void space under the lock insert 33; however, their subsequent fracture upon movement of the metal usually breaches any seal initially developed. In some instances, the point of the drill may enter a fluid pressure cavity and open a new path to fluid under pressure. If the opening is a pin-point opening, it may not even be noticed when the lock is inserted and it may be very difficult to track down when a fluid seepage occurs around the installed lock insert.

In short, the present tools and methods applied in metal stitching often result in loss of an air tight seal which is the primary objective of the repair process. The consequence is a slow leak or seepage around the metal stitching repair site. Less frequently, but certainly more serious, is the break in the lock structure which results in major failure of the repair.

OBJECTS AND SUMMARY OF THE INVENTION

It is an object of the present invention to provide an improved lock insert which greatly increases the gripping and retaining power of the lock with respect to the casting structure.

An additional object of the present invention is to enhance the air-tight seal desired with the lock and/or stitching pin.

A still further object of the present invention is to increase the sealing contact around all parts of the lock insert to reduce fluid transfer under the lock.

An additional object of this invention is to provide an improved method of installation of the lock and/or stitching pin to reduce the required time and to increase the effectiveness of the developed seal.

These and other objects of the present invention are realized in an improved lock insert which includes at least one center lobe coupled to a plurality of radially smaller locking lobes and a plurality of even smaller connecting lobes, the connecting lobes being disposed in interconnecting relationship between the locking lobes. These lobes are formed as solid, cylindrical bodies which intercept the body of adjacent lobes such that exterior wall portions of the respective cylindrical bodies are intercepting and form a groove into the lock insert. Each lobe has a central axis in parallel axially alignment with other central axes of the remaining lobes. The cylindrical bodies may include a conical shaped base end which is matched in contour and inclination with a receiving portion of a slot into which the lock is to be inserted. This lock is used in connection with a sealing pin having a head and shank and being adapted for insertion into predrilled holes along a cracked portion of a casting or similar structure to be repaired. The shank includes a programmed shear plane and an upper wedge member which is positioned below the shear plane and around a shank perimeter which falls within a plane (i) normal to the central axis of the shank and (ii) converges downward toward the central axis, tapering from a larger shank diameter to a smaller diameter. Below this wedge member is a threaded shank section which preferably has a uniform radius along its threaded length. A lower end of the pin may also add a wedge configuration shaped in the form of a cone and corresponding in configuration to a receiving portion of a pre-drilled hole which has a similar inverse conical shape to permit the pin to fully seat thereat. It is also preferred that the axial lengths of the respective upper wedge member, threaded shank and lower or terminal wedge are such that the lower wedge makes contact with the mating or seating base interior surface of the preformed hole prior to full engagement of the upper wedge member with the upper threads of the hole to enable further rotation of the pin wherein (i) threads at a lower end of the pin are compressed because of blocking action of the base surface of the hole against further downward displacement of the pin, while (ii) top threads of the hole are crushed by slight continued displacement of the upper wedge, thereby developing a top and bottom seal to respective top and bottom crushed threads.

The respective lock and pin are used as a part of method of metal stitch repair wherein the lock insert has a center lobe and a plurality of smaller locking and connecting lobes. The method steps include drilling at least one center lobe hole near a cracked or separated repair site of the metal casting or structure. Next, a connector lobe jig is positioned at the center lobe hole having at least one projecting center lobe insert and a plurality of properly spaced connector lobe drill holes. The center lobe insert is placed within the center lobe hole with the remaining holes being appropriately aligned in somewhat perpendicular relationship with respect to the track. A drill is inserted into the respective holes and operated to prepare either connector lobe holes or locking lobe pilot holes. The pilot holes are then drilled with a larger size drill to form the locking lobe holes which intercept the respective connector lobe holes, the combination of center lobe, locking and connector lobe holes forming a continuous open slot with changing diameters for alternating locking and connector holes adapted to receive the lock insert. Finally, the lock insert is positioned over the holes and is forced into a seated position within the open slot. Stitching pins may then be inserted along the crack which intercepts the lock insert to finally seal the repair site.

The improved lock insert provides greater strength to prevent breaking and an improved seating configuration to develop a stronger seal around the periphery of the lock. In addition, conical ends at the lower end of each lobe seat in corresponding holes to also seal the bottom side of the lock insert. The stitching pins offer a preferred seal which arises from the crushed threads at the top opening and base of the pre-drilled holes along the crack. Together, the lock and stitching pins can increase by many fold the amount of fluid pressure previously subjected to repair sites under metal stitching processes.

Other benefits and features of the present invention will be apparent to those skilled in the art, in view of the following detailed description, in combination with the drawings.

DETAILED DESCRIPTION OF THE INVENTION

Figure 1:
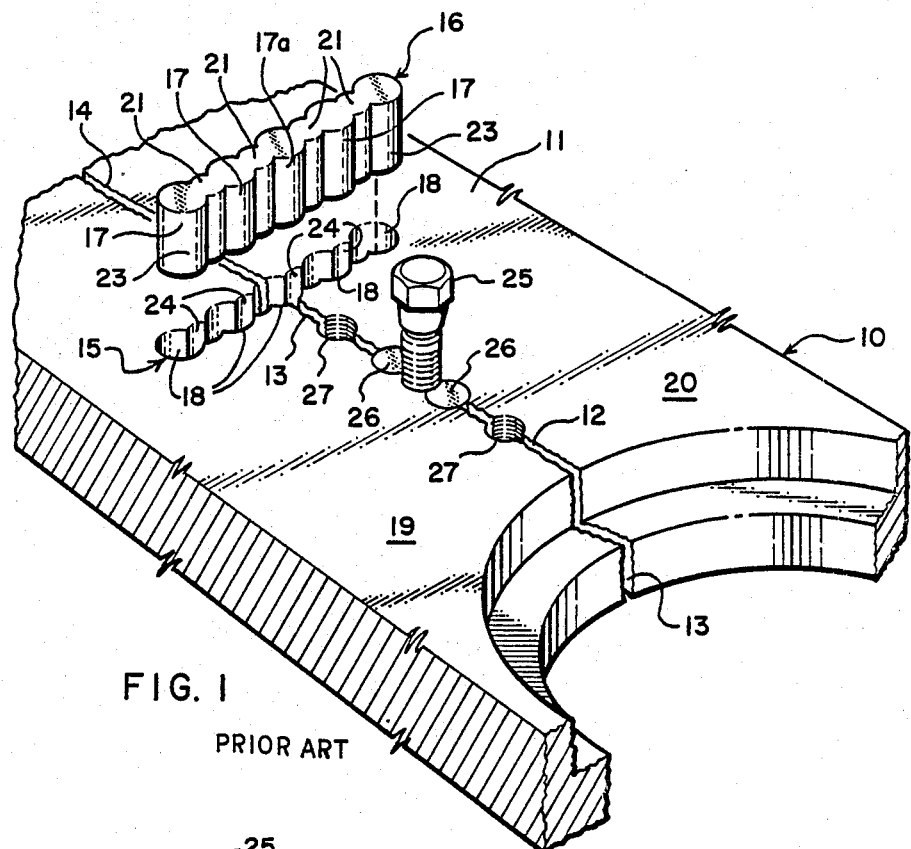
FIG. 1 is a perspective view of prior art elements comprising the metal stitching process.
Figure 4:
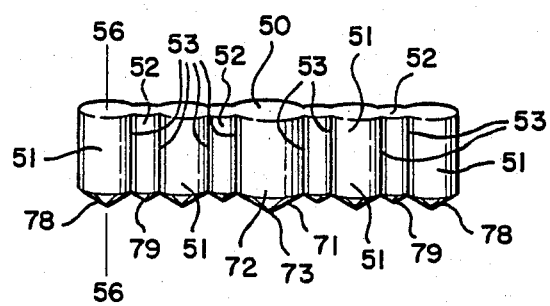
FIG. 4 shows a perspective view of a lock insert constructed in accordance with the present invention.

FIG. 4 illustrates an improved lock insert which offers many advantages over the prior art insert as disclosed in FIG. 1. The construction of the lock insert of the present invention includes a center lobe 50 which is coupled directly or indirectly to a plurality of radially smaller locking lobes 51 and a plurality of connecting lobes 52. The connecting lobes 52 are radially smaller than the locking lobes 51 and are dispposed in interconnecting relationship between connecting lobes and/or the center lobe and other connecting lobes. Each of these lobes comprises a cylindrical body formed of a metal which is compatible with the metal material to be repaired. Each of the respective cylindrical bodies 50, 51 and 52 intercepts the body of an adjacent lobe such that exterior wall portions of two respective cylindrical bodies are intercepting and form a locking groove 53 at a lateral surface of the lock insert. These locking grooves occur at a junction of the lateral wall surfaces of the respective intercepting lobes and are designed to fit tightly at corresponding locking ridges 54 within the predrilled slot 55 which receives the lock insert.

Each of the lobes has a central axis 56 (illustrated on one lobe only in FIG. 4) which is oriented in parallel relationship with each of the other central axes of the lobes. Each lobe has a corresponding drilled hole 60, 61 and 62 which provide a tight fit for the inserted lobe and which collectively form the insert slot 55. It will be noted that the drilled holes of the slot and the lobes of the lock insert have common geometric orientations, illustrated as linear arrangements in the drawings. In this configuration, each lobe is joined to no more than two adjacent lobes.

Figure 5:
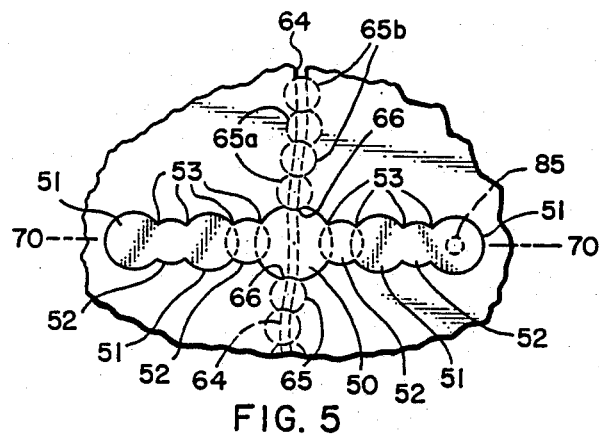
FIG. 5 shows a top view of the lock insert shown in FIG. 4.
Figure 8:
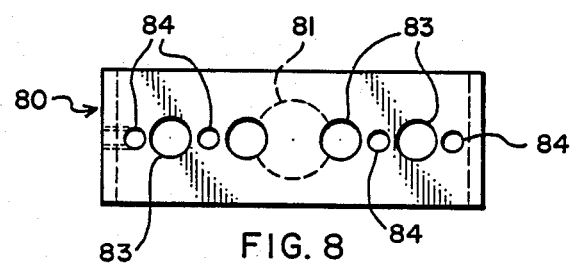
FIG. 8 is a top view of the gig illustrated in FIG. 7.

In the preferred embodiment illustrated, the center lobe cylindrical body 50 intercepts the cylindrical bodies of two connecting lobes 52. FIG. 5 illustrates the overlap between cylindrical bodies of the respective center lobe 50 and adjacent connecting lobes 52. In the disclosed linear configuration, the connecting lobes are disposed on opposing sides of the center lobe 50 and are further intercepting with the cylindrical bodies of locking lobes 51. This combination forms the smaller construction of a lock insert comprising a combination of lobes commencing at one side with the locking lobe 51, a coupled connecting lobe 52, the attached center lobe 50, and contiguous connecting lobe 52 and locking lobe 51. The additional pair of connecting lobe 52 and locking lobe 51 attached at each end of this basic lock insert unit is a preferred construction because the additional two locking lobes provide greatly increased strength to the lock insert. It will be apparent to those skilled in the art that additional connecting and locking lobes may be attached as desired to increase the length of the lock insert. The length of lock insert and pre-drilled slot are of necessity equal to insure a tight, fully seated and filled slot by virtue of the inserted lock. It will also be apparent to those skilled in the art that the center lobe 50 may likewise be directly attached to a locking lobe 51, instead of the to the connecting lobe 52. In this configuration, the adjacent connecting lobe 52 shown in FIG. 5 would simply be deleted, with the terminal tri-lobe structure of locking lobe/connecting lobe/locking lobe 51-52-51 being coupled directly to the center lobe 50.

Figure 6:
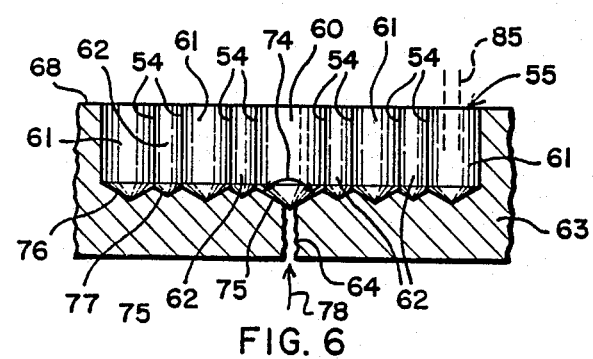
FIG. 6 shows a cross sectional view of a pre-drilled slot configured to receive the lock insert of FIG. 4.
Figure 9:
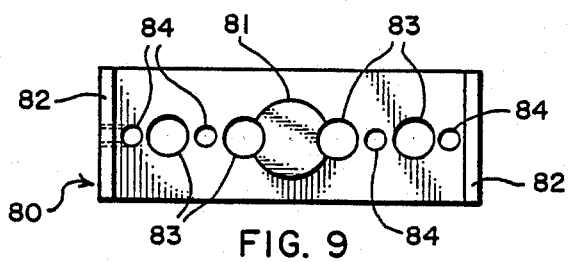
FIG. 9 is a bottom view of the gig illustrated in FIG. 7.

Each of these lobes has primary functions which provide an overall improvement over the prior art. For example, the center lobe 50 has an enlarged structure which increases structural strength across the lock insert body. This strength is particularly important at the location of the crack or specific repair site. As is shown in FIG. 6, this crack 64 will typically be located within the center of the center lobe. The size of the center lobe is significant when viewed with the fully installed lock insert and sealing pins (to be discussed hereafter). As can be noted from FIG. 5, the additional use of sealing pins 65 involves cylindrical cuts on each side of the center lobe 66 which remove a portion of the center lobe along the crack line 64. By substantially increasing the size of the center lobe, sufficient material remains along the crack line 64 and between the interior sides 66 of the sealing pins to provide the required strength so that the lock insert does not split or break under separating stress which attempts to enlarge the crack 64.

The preferred orientation of the lock insert is along a plane 70 which is substantially perpendicular to the crack 64. This places the respective lobes 50, 51 and 52 in a coupled configuration such that the cylindrical bodies of the connected lobes substantially fall within this common plane 70.

The specific dimensions of the center lobe, connecting lobe and locking lobe will vary, based on the specific repair location and composition. As an example of a preferred arrangement of sizes, the following dimensions are provided for use with a typical engine block of cast iron. In this example, the center lobe has a diameter of approximately one half inch or 1.27 centimeters. The connecting lobe has a diameter of 0.265 inches or 0.67 centimeters and the locking lobe illustrated has a diameter of 0.375 inches or 0.95 centimeters. Other dimensions may be selected; however, the general relative sizes will remain the same. In other words, the center lobe will be substantially larger than the connecting lobe and larger locking lobe.

The total length of the lock insert illustrated in FIG. 5 is approximately two and one half inches or 6.35 centimeters the distance from the center of the center lobe to the center of the first connecting lobe is 0.309 inches or 0.78 centimeters. The distance between the center of the connecting lobe and an adjacent locking lobe is 0.25 inches or 0.635 centimeters. Each alternating pair of connecting end locking lobes have a comparable distance from center to center. The dimensions of the drilled slot 55 correspond to the lock insert dimensions.

Another distinctive feature of the present invention is the utilization of a conical base 71 (FIG. 4) coupled to the base end 72 of the cylindrical body. In the preferred embodiment illustrated, each of the cylindrical bodies or lobes includes a pointed, conical base end tapering from the larger radius of the cylindrical base 72 to a pointed end which forms the pointed distal base 73 of the lobe. The conical angle of convergence for each conical base matches the convergence angle 74 of the corresponding conical base section of each cylindrical opening of the pre-drilled slot 55 (FIG. 6). These conical base sections are formed by the pointed end of a drill bit which is utilized in accordance with the preferred method of practice to form the pre-drilled slot configuration shown in FIG. 6. Accordingly, each cylindrical lobe with its pointed base corresponds to the same geometrical configuration and size as the drill bit utilized to form its seated portion within the slot 55. In the preferred embodiment, it will be noted that the respective pointed distal bases of the lock insert are also aligned along common plane 70.

When the lock insert is placed within the slot 55, it can be further driven into a seated position such that each cylindrical void 60, 61 and 62 and their respective base sections 75, 76 and 77 are totally filled with the metal structure of the insert lock. Accordingly, fluids such as oil which tend to flow up the crack of the casting being repaired are unable to seep along the base end of the insert lock, through the conical voids formed by the pointed drill bits. In accordance with the present invention, a total sealing occurs along the wall contact structure of both the conical base and the cylindrical body. This increases the strength of the lock insert, as well as improves the seal of the insert against leakage. Strength is increased against the separating stress causing the crack 64 because the conical base structures 73, 78 and 79 apply a counter force against separation of the respective conical sections of the slot 75, 76 and 77. This counter force is the same which arises from the ridges 54 with respect to grooves 53. Therefore, each conical base of the locking lobes, as well as the connector lobes, resist the separation force which can widen the crack and break the effective seal. Accordingly, the present invention develops the surprising and unexpected results of improved strength in the lock insert in addition to improved sealing of the lock cylindrical bodies at the base of the slot 55.

Figure 7:
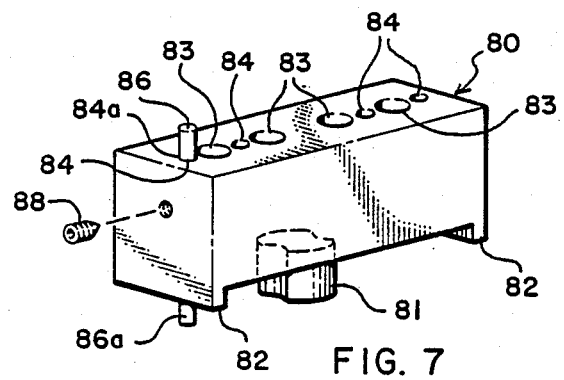
FIG. 7 is a perspective view of a drill gig useful in forming the pre-drilled slot of FIG. 6.

These interrelationships between locking insert and pre-drilled slot 55 will be better understood with reference to the method of installation as set forth below. This improved method of metal stitching may be applied with respect to any metal such as casting material or similar metal structure which has developed a crack or other basis for need of repair. The crack identified as item 64 in FIG. 5 and FIGS. 5 and 6 will serve to illustrate the method. Initially, the center lobe hole is pre-drilled at the intersection of the crack 64 and at imaginary intersecting line 70. The size of this hole is configured with a relatively large opening and a base surface and interior wall surface which have a tight fit at both surfaces with respect to the center lobe of a lock insert which is to be inserted therein. A connector lobe jig 80 (FIG. 7) is utilized to drill the cylindrical openings as part of the slot for receiving the lock insert. The connector lobe jig includes a positioning dowel 81 having a diameter slightly smaller than the opening of the center lobe hole just formed. The jig includes two shoulders 82 which raise the jig approximately ⅛th inch above the face of the repair site. This allows shavings developed by the drill bit to be cleared from the slot openings being formed with the jig.

This positioning dowel or center lobe insert 81 is nested in the center lobe hole formed in the previous step, with the jig 80 being aligned along intersecting line 70 at approximate right angles to the crack 64. Four cylindrical openings 83 exist in the jig and provide a stabilizing housing for a drill bit inserted therein. The position of the connector lobe cylinders 83 conform exactly to the relative positions of the connector lobes found in the lock insert. An appropriate drill bit is inserted into the respective openings 83 and four holes 77 are drilled into the casing material 63 to be repaired. Each of these holes is drilled to the same depth, which corresponds to the length of the connector lobe cylinder and its conical base. This depth may be slightly less to provide a portion of the lock insert being exposed above the face 68 of the repair site.

Figure 10:
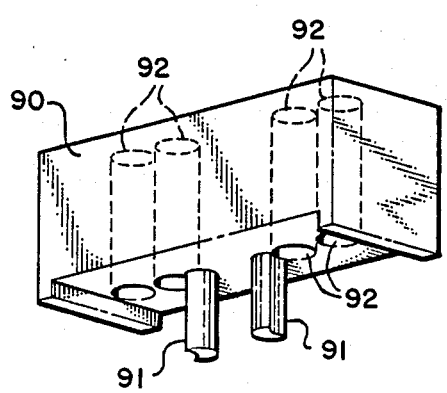
FIG. 10 is a perspective view of an additional gig structure useful in preparing the pre-drilled slot of FIG. 6.

The connector lobe jig may also include locking lobe pilot drill holes 84 which are smaller in size than the connector lobe drill holes and which operate to more exactly guide the subsequent drilling of locking lobe holes. One pilot drill hole 84a is utilized to drill a first locking lobe pilot drill hole 86. A positioning dowel 86 is then inserted into the first pilot drill hole 84a and secured by a lock screw 88 into position with an extended leg portion 86a projecting from the base of the jig. This projecting leg 86a is inserted into the first drilled pilot hole 86. This dowel 86a is inserted into a pilot hole 85 to lock the jig 80 in position based on the center lobe insert 81 and leg 86a. The remaining pilot holes are drilled utilizing the remaining guide holes 84. Once the guide holes are in position on the casting or other repair site, the first jig 80 is removed and replaced with a second jig as illustrated in FIG. 10. This second jig 90 includes two positioning legs 91 which are sized to fit within the earlier drilled connector lobe holes 62 formed in the repair site. A substantially tight fit of the positioning legs 91 fixes the position of the second jig 90 over the intersecting line 70 on the repair site. The second jig 90 includes four guide holes for drilling the locking lobe holes. These guide holes 92 are positioned so that the pilot holes previously drilled are centered under each respective guide hole 92. The locking lobe holes are then drilled to the appropriate depth and with the appropriate overlap into the connector lobe holes 61. The use of the second jig insures proper alignment and spacial relationship of the locking lobe holes with respect to the preceding center lobe and connector lobe openings.

Utilization of the jigs provides a predictable slotted configuration which exactly matches the lock insert as described in FIG. 4. This matching configuration includes not only the cylindrical shape formed by the diameter of the drill bit, but also the base surface of holes contained in the conical sections 75, 76 and 77. As previously indicated, the conical structure has an inclination angle approximately conforming to the convex conical structure occurring at lower ends of the lock insert. All depths correspond to the lengths of the respective lobe members of the lock insert.

The lock insert is then positioned over the formed slot, with each lobe being aligned with its corresponding opening in the slot configuration. This slot is then driven by a ball peen hammer or other driving means into the slot opening. The lock insert fills all parts of the slot and develops firm contact at the cylindrical walls and at the conical base section to provide a full seal. The impact force of the ball peen hammer against the lock insert allows the lock insert material to expand and fill any remaining voids. Once the slot has been fully inserted, the top surface which extends beyond the repair surface 68 is machined to a finished surface. This completes installation of the lock insert. The casting material is now secured in spacial relationship and the crack 64 is no longer capable of enlarging based on the resistance offered by the inserted lock member. These procedures may be followed with several additional lock inserts as may be required to fully secure the repair location to prevent the crack 64 from changing position or enlarging. The next step is to fill the crack with sealing pins as is discussed hereafter.

Figure 2:
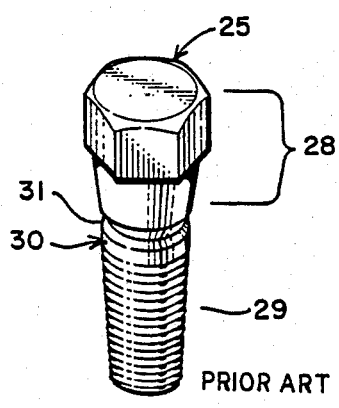
FIG. 2 is a perspective view of a prior art pin used to seal cracks as part of the metal stitching process.
Figure 3:
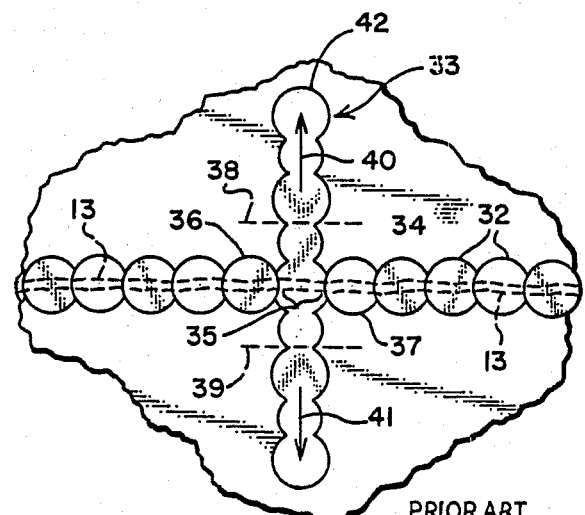
FIG. 3 is a graphic representation showing prior art techniques of metal stitching.

As was illustrated in FIG. 1, repair of the crack 12 or opening in the casting material is completed by utilizing sealing pins 25 which are installed in drilled openings 27 which are prethreaded to receive the sealing pin. As is illustrated in FIG. 5, the sealing pins are installed in overlapping relation to insure maximum seal along the crack line 64. A typical procedure is to drill alternating holes 65a, install the sealing pins and then drill between the installed pins 65b. In this instance, the drilled hole cuts through a portion of each adjacent installed sealing pin, making a new hole to be threaded and seated with additional sealing pins. A prior art sealing pin is shown in FIG. 2 and has been previously discussed.

Figure 11:
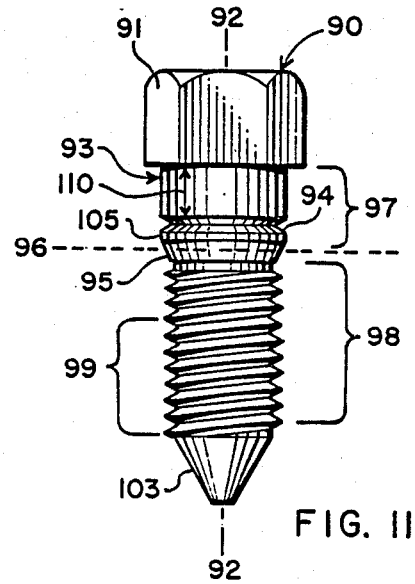
FIG. 11 shows a perspective view of a sealing pin constructed in accordance with the present invention.

An improved sealing pin is disclosed in FIG. 11 in accordance with the present invention. This sealing pin 90 comprises a head 91 configured for rotational movement about a central axis 92. The head has an hexagonal configuration; however, other forms of heads are suitable, provided they enable application of a strong rotational force which is required to install the pin in its threaded opening at the crack location. Typically, installation of the pin will develop a resisting force which the head configuration must overcome as it is rotated into place within the casting.

The sealing pin next includes a shank 93 which is connected to the head 91 and has a central axis common with the central axis 92 of the head. The shank is composed of several component parts which provide significant improvement in installation and performance of the sealing pin as part of the metal stitching process.

This shank includes a programmed shear plane formed within the shank as an annular notch 94. This notch extends around the periphery of the shank and creates a point of lower tensile strength such that rotation of the bolt head 91 imposes torque on the shank of the pin 90 and causes the shank to break at the shear plane when the resisting force within a threaded opening into which the sealing pin has been fully seated exceeds the shear strength at the notched section 94 of the shank. This shearing action should not occur until sufficient rotational force has been applied through the head 91 to fully seat the shank in its threaded opening in accordance with the inventive principles set forth hereafter. If the shearing action occurs prematurely, then the effective seal intended by this invention does not occur.

Figure 12:
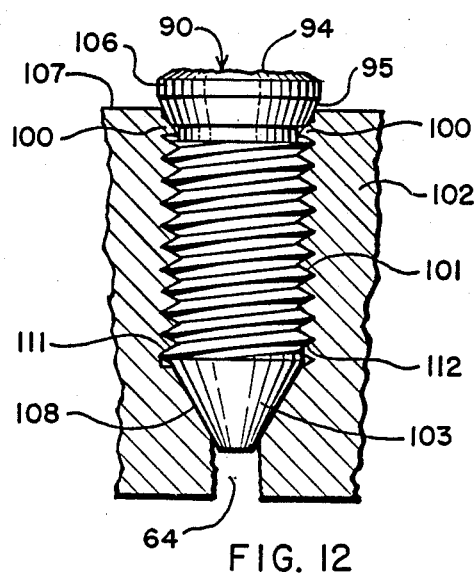
FIG. 12 illustrates a sheared sealing pin within a cross section of the casting repair site.

Several design features of the lower shank of the sealing pin facilitate an improved seal within a threaded sealing pin hole. Specifically, these features include a beveled upper wedge member 95 formed as a chamfered edge around the shank perimeter. This upper wedge member falls within a plane 96 which is substantially normal to the central axis 92 of the shank and which is below the shear plane notch 94. The chamfered edge 95 converges inward toward the central axis 92, tapering from a larger shank diameter in the upper shank section 97 to a smaller shank diameter in the threaded section 98. This upper wedge member operates to crush upper threads 100 of the pre-drilled pin hole 101 formed in the crank casting or repair site 102. This is illustrated in FIG. 12, which shows the chamfered edge 95 in its fully seated position wherein the upper threads 100 have been displaced by the wedging effect of the chamfered edge 95. Although the drawings show a space between these opposing surfaces, it is to be understood that the chamfered edge 95 actually forms a full contact with the crushed threads 100 of the top opening.

To insure that the wedge member 95 is permitted to crush the upper threads 100 of the opening, the length of the threaded shank portion should be no greater than the depth of the preformed hole 101. If the shank length exceeds the depth of the hole, the seating action of the shank conical base 103 will occur prior to contact between the upper threads 100 and the wedging member 95. Consequently, the crushing action of the upper threads would not occur and would fail to form the final seal realized with the sealing pin of the present invention.

Further improvement in the seal between the pin 90 and threaded opening 101 is accomplished by using a threaded shank section 98 having a uniform diameter approximately equal to the smaller diameter of the upper wedge member. This threaded section 98 is configured for a tight fit within the threaded portion 101 of the pre-drilled pin hole. The threads 99 of the sealing pin are roll-formed to provide increased strength and improved fit with respect to threads of the pre-drilled hole 101. By roll-forming the pin threads 99, increased density of thread material is developed, increasing its strength and lessening the likelihood of thread shear as the pin is rotated into its seated position in the casting material. In addition, threaded structure is more uniform in size and geometry and therefore develops a better contact with the threads of the pre-drilled hole 101. Such improved contact further enhances the sealing action of the pin against possible leakage around the pin body.

A shoulder section 105 of the shank is provided between the shear plane notch 94 and the upper wedge member 95. This shoulder displaces the shear plane from the threaded section 98 and insures that a short shank extension 106 will be provided above a top surface 107 of the casting material 102. This is illustrated in FIG. 12, wherein the pin head 91 and attached shank portion have broken free from the remaining lower shank along the notch 94 and its defined shear plane. Following complete installation of all pins along the casting crack, this shank extension 106 will be machined down to the surface level 107 of the casting material.

A tapered terminal wedge 103 is formed at the base of the pin, and matches the inclination angle of a mating base interior surface 108 in the preformed hole 101. This terminal wedge contact creates an initial seal which prevents fluid flow along the length of the lock insert.

An additional seal is created at the base of the threaded section 98 by causing lower threads 111 of the pre-drilled hole to crush or compress within the lower threads 112 of the sealing pin. This is accomplished by providing axial lengths of the respective upper wedge member 95 threaded shank and terminal wedge 103 such that the lower wedge 103 makes contact with the mating base interior surface 108 just prior to full engagement of the upper wedge member 95 with the upper threads 100 of the preformed hole. Slight further rotation of the sealing pin then causes the threads at the lower end of the pin 112 to be compressed because of blocking action of the base surface 108. The lack of further downward displacement of the pin causes displacement of the threads 111 and 112 in a crushing manner, thereby developing a bottom seal similar to that formed at the top seal at threads 100.

It will therefore be noted that the preferred embodiment set forth above maximizes sealing contact along the full pin structure. This sealing contact commences at the base of the pin at inclined edge 103, which engages the base portion 108 of the pre-drilled hole. Sealing contact is further enhanced at the crushed thread combination of 111 and 112 around the periphery of the base of the sealing pin. Additional sealing contact occurs along the full length of the threaded section 98 as it engages corresponding threads in the pre-drilled hole 101. Finally, additional sealing contact is developed by the crushed threads 100 against the chamfered wedge member 95.

Although most inclinations of the upper wedge member 95 will provide some sealing action at threads 100, a preferred wedge member configuration comprises a truncated cross section of conical configuration which is inclined with respect to the central axis at an angle within the range of 30 to 70 degrees.

A typical set of dimensions for a sealing pin constructed in accordance with the principles of this invention is as follows. For a total pin length of 0.95 inches or 2.413 centimeters extending from the top of the head 91 to the distal end of the lower wedge 103, the shank section above the shear plane 94 has a length 110 equal to 0.600 inches or 1.5 centimeters. The diameter of this shank section is 0.275 inches or 0.70 centimeters. The length of the threaded shank section 98 and lower wedge 103 equals 0.5 inches or 1.27 centimeters. The diameter of the threaded section of the shank is 0.225 inches or 0.57 centimeters. The length of the lower wedge member 103 is 0.15 inches or 0.38 centimeters along the central axis thereof. The shear plane notch 94 comprises a radial cut of 0.035 inches in depth or 0.09 centimeters. The angle of inclination of the base wedge member 103 with respect to the central axis and the inclination of the upper wedge member 95 with respect to the central axis will typically fall within the range of 30 to 70 degrees. The preferred inclination is approximately 56 degrees. It is preferable to have the angles of inclination of the upper wedge member and terminal wedge approximately equal.

The length of the shoulder section 110 does affect the previously discussed sealing affect of the crushed threads. It has been found that a proper shoulder length of between 0.050 to 0.300 inches will result in proper shear of the sealing pin. If the shoulder section is too long, shear may occur too quickly, prior to realizing a full seal at the top and bottom threaded portions of the shank. A preferred length 110 is approximately 0.145 inches or 0.36 centimeters.

The improved sealing pin offers many advantages over the prior art design represented in FIG. 2. For example, the prior art wedge design of the sealing pin tends to spread the crack 64 apart as it is forced into the pre-drilled hole. The uniform diameter of the present sealing pin eliminates these lateral forces, while at the same time increasing the amount of contact between the threaded shank and the drilled hole. Furthermore, whereas the prior art sealing pin has its primary sealing contact at the top of the threads, in view of the tapered shape of the pin, the present sealing pin developes full contact down the length of the shank and even at the tapered base section. Another benefit is the thread-crushing effect with respect to the present sealing pin which tends to seal off potential leakage into the thread area. Prior art structures left open access into the threads from increasing the liklihood of leakage. In addition to the upper and terminal wedge structure, significant improvement in sealing effect is developed by the use of roll-formed threads. As has been previously mentioned, such threads contribute greatly to increased strength, as well as to improved sealing affect.

These specific procedures for inserting sealing pins are similar to those followed with prior art sealing pins. After the hole is drilled, it is tapped for the appropriate thread size corresponding to the pin to be inserted. The pin may be inserted either by impact or pneumatic wrench and should shear so that at least 0.02 inches of shoulder section remain above the surface of the repaired part. After the total length of crack is sealed with such pins, the unit is tested to evaluate the completeness of repair.

Test data with respect to the results developed by the present invention are both surprising and unexpected. Whereas prior art metal stitching techniques have been typically applied to operate within pressure ranges up to 1,000 psi, the present lock system and sealing pin configuration have been tested past 2,500 psi, and are believed to be effective up to 5,000 psi. In fact, testing limitations have hampered the ability to determine maximum pressure capable for this type of metal stitching process because valves and other casting materials which have been tested are simply not rated for higher psi values.

It will be apparent to those skilled in the art that the disclosure of preferred embodiments set forth herein are merely examples of the inventive features which have been more specifically defined in the attached claims. It is therefore to be understood that the use of such examples is not to be construed as limiting the invention, except as provided in the following claims.

I claim:

1. A lock insert for use in the process of metal stitching of castings and similar structures, said lock comprising:
   at least one center lobe coupled to a plurality of radially smaller locking lobes and a plurality of connecting lobes which are radially smaller than the locking lobes and which are disposed in interconnecting relationship with the locking lobes, said center lobe being coupled to at least one locking lobe;
   each of said lobes having a cylindrical body which intercepts the body of an adjacent lobe such that exterior wall portions of the two respective cylindrical bodies are intercepting and form a locking groove at a lateral surface of the lock insert at a junction of the wall surfaces of the respective intercepting lobes;
   each of said lobes having a central axis in parallel, axial alignment with other central axes of the remaining lobes and being coupled to no more than two adjacent lobes.

2. A lock insert as defined in claim 1 wherein the center lobe cylindrical body intercepts the cylindrical bodies of two connecting lobes on opposing sides of the center lobe, each connecting lobe further intercepting the cylindrical body of a locking lobe to thereby form a lock insert comprising a combination of lobes commencing at one side with a locking lobe, coupled to a connecting lobe, said connecting lobe being coupled to the center lobe, which is coupled to a second connecting lobe, the second connecting lobe being coupled to a second locking lobe.

3. A lock insert as defined in claim 2 further comprising additional connecting lobes coupled to end portions of the locking lobes, with additional locking lobes being coupled to end portions of the additional connecting lobes.

4. A lock insert as defined in claim 3 wherein additional alternating connecting and locking lobes are respectively coupled to end portions of distal locking lobes of the lock insert to thereby extend the length of the lock insert to match the length of a predrilled slot location in the casting or similar structure.

5. A lock insert as defined in claim 1 wherein the respective lobes are coupled together such that the respective cylindrical bodies of the lobes substantially fall within a common plane.

6. A first lock insert as defined in claim 1, further comprising a mating surface formed at a top portion of the lock insert opposite from a base portion thereof, said insert being adapted for insertion into a predrilled slot within the casting, said mating surface having a configuration compatible with full surface contact with a surface of a second lock insert configured as defined in claim 1 with the same number and sizes of lobes as the first lock insert and wherein the central axes of corresponding lobes of the first and second inserts are substantially coincident, thereby enabling insertion of both first and second lock inserts into a single slot with the mating surfaces forming a sealing contact therebetween.

7. A lock insert for use in the process of metal stitching of castings and similar structures; said lock comprising:

at least one center lobe coupled to a plurality of radially smaller locking lobes and a plurality of connecting lobes which are radially smaller than the locking lobes and which are disposed in interconnecting relationship with the locking lobes;

each of said lobes having a cylindrical body which intercepts the body of an adjacent lobe such that exterior wall portions of the two respective cylindrical bodies are intercepting and form a locking groove at a lateral surface of the lock insert at a junction of the wall surfaces of the respective intercepting lobes;

each of said lobes having a central axis in parallel, axial alignment with other central axes of the remaining lobes and being coupled to no more than two adjacent lobes;

at least one of said lobes including a conical base end tapering from a larger radius substantially equal to a radius of the cylindrical body to which it is attached, down to a pointed end which forms a pointed distal base of the lobe.

8. A lock insert as defined in claim 7, further comprising a plurality of conical base ends individually coupled to a plurality of the respective cylindrical bodies and aligned such that the respective pointed distal bases are substantially positioned within a common plane.

* * * * *